Patented Dec. 17, 1946

2,412,590

UNITED STATES PATENT OFFICE 2,412,590

ELASTOMER ADAPTED FOR A CHEWING GUM BASE

Boris N. Lougovoy, Jackson Heights, N. Y.

No Drawing. Application September 21, 1942,
Serial No. 459,185

11 Claims. (Cl. 99—135)

In the preparation of chewing gum bases it is recognized that the elastic component or components must possess certain specific qualities in order to produce the proper characteristics with regard to the "chew" and to the workability of the compound and its ingredients on the machines employed in the preparation of the base and in the final formation of the chewing gum units. These characteristics are (a) proper degree of elasticity, which generally is determined by the molecular structure of the components and by their molecular weight, and (b) ready blendability and/or mutual solubility relationship with the non-elastic components of the base such as synthetic resins and waxes.

It is the object of the present invention to provide an improved chewing gum base having the desired characteristics in higher degree than heretofore obtained with proposed compositions, with better chemical stability toward oxidation, with full control of quality, and the obtaining of uniform products.

The characteristic of my chewing gum base is that the principal or very substantial elastic component consists of the polymer of a methacrylic acid ester monomer having in the ester radical three or more carbon atoms, and an ester of abietic and hydrogenated abietic acid. With the elastic component is compounded any of those commonly used materials which are generally used to impart smoothness, freedom from tack and other desired qualities. Thus natural and synthetic resins, waxes, oils and hydrogenated oils, suitable plasticizing materials generally, and other agents which are added to chewing gum mixes for obtaining special effects may be employed. With the said elastic component may also be compounded other components of desired properties such as chicle, jelutong, gutta siak, gutta hangkang, gutta kay, and other gums and latices.

As stated above methacrylic acid ester polymer having in the ester radical three or more carbon atoms, and an ester of abietic acid, which latter acid may be hydrogenated, are employed as my primary elastic components. The polymer, therefore, may be butyl methacrylate and the abietate may be a member of the group consisting of methyl di-hydro abietate, methyl abietate, di-methyl abietate, di-methyl hydro abietate, and their ethyl homologues. While none of the methacrylate resins possess any degree of elasticity at normal temperatures, my elastic component forms an elastomer of very excellent characteristics for use in chewing gum mixes. As equivalents of butyl methacrylate may be mentioned the interpolymer isobutyl-butyl methacrylate and any methacrylic acid ester monomer having in the ester radical three or more carbon atoms. With respect to the abietic acid esters, I prefer that these materials be of honey-like consistency, although the harder esters are not precluded as modifying agents.

As an example:

*Example I*

Parts by weight

Elastic component consisting of butyl methacrylate 83.5%; methyl di-hydro abietate 12.5%, to which candelilla wax may be added about 4.0%_____ 30
A crystalline resin such as amyrin acetate of chicle or any high melting crystalline resin which possesses a hydrophilic characteristic, i. e. in that it retains some water, on contact with the latter, and swells in a manner similar to natural resins_____ 25
Low-melting non-crystalline hydrophilic resin to soften the higher melting resin inasmuch as the latter has a melting point of approximately 208° C. Such a low melting hydrophilic resin is known in the trade as low melting resin X2190-26 made by Hercules Powder Co., Wilmington, Delaware____ 45

The components of the above example are mixed in accordance with standard practice in the chewing gum industry in the preparation of chewing gum bases, employing heat and the usual types of mixing vessels. To prepare an excellent chewing gum from the said base it is only necessary to add a suitable portion of sweetening and flavoring materials. Thus to 20 parts of the Example I gum base may be added 60 parts of sugar, 15 parts glucose, and 1% flavor, the finally prepared chewing gum being rolled to sheet form and cut into suitable units, as for example slabs, the slabs being sugar dusted and wrapped according to usual procedure. The chewing gum thus prepared is hard in the sense that hardness is desired, but it has an easy "biting" characteristic, because the gum has what might well be termed a honeycomb structure which is contributed by the crystalline hydrophilic resin, the function of which is set forth in the patent to Jackman No. 2,078,878. It will thus be seen that Example I has been employed to illustrate but a high type of chewing gum base incorporating my elastic component, and that while the resins employed in the combination result in the securing of very desirable properties in the chewing gum base and chewing gum product made therefrom, the use of these specific materials is not essential, since my elastic component may be combined with any other desirable chewing gum base material which may require, or be improved by my elastic component.

Example II

| | Parts by weight |
|---|---|
| Elastic component as specified in Example I or the equivalents set forth in the above specifications | 50 |
| A blend of natural gums commonly employed as a substitute for chicle, such as two or more of the following: jelutong, gutta hangkang, gutta kay, in which jelutong is the major component, the blend being made smooth by the addition of a wax or waxes and/or oil or oils. The proportions of the natural gum may be widely varied, it being only necessary to employ a proportion of the selected two or more gums controlled in accordance with the wishes of the blender as to the prominence of any one gum so as to secure its particular characteristic, as well known in the art. It is generally considered that jelutong is desirable in greater proportion than any of the other gums mentioned | 50 |

Example III

| | Parts by weight |
|---|---|
| Elastic component consisting of butyl methacrylate 400 parts and methyl dihydro abietate 70 parts | 30 |
| Low melting non-crystalline hydrophilic resin such as specified in Example I | 38 |
| High melting crystalline hydrophilic resin such as specified in Example I | 25 |
| Penterythrityl-abietate resin, having a melting point of 113-115° C., known as "Pentalyn" | 7 |

Example IV

| | Parts by weight |
|---|---|
| Elastic component as specified in Example I | 30 |
| Low melting non-crystalline hydrophilic resin such as specified in Example I | 38 |
| High melting crystalline hydrophilic resin such as specified in Example I | 25 |
| Terpene polymer resin of which an example is "Nypene," made by Neville Chemical Co. | 7 |

Example V

| | Parts by weight |
|---|---|
| Elastic component as specified in Example I | 30 |
| Low melting non-crystalline hydrophilic resin such as specified in Example I | 38 |
| High melting crystalline hydrophilic resin such as specified in Example I | 25 |
| Glycerol ester of hydrogenated abietic acid of which "Staybelite Ester No. 10," made by Hercules Powder Company, Wilmington, Delaware, is an example | 7 |

The function of the "Pentalyn," and also of the "Staybelite Ester No. 10" and the "Nypene" is to regulate the final melting point of the resin as a blend and the mutual solubilities of the resin in my elastic component. It will be understood that other materials recognized as having the same functions may be employed in substitution of the stated materials.

The examples show that my elastic component has wide adaptability for use with various types of materials suitable because of their inherent characteristics for use as structure-imparting and softening and smoothing additions to the elastic component in a chewing base. Many materials not specified above, but employed in the chewing gum industry, as base materials, have the same compatibility with my elastic component, so that it will be understood that the above examples are merely illustrative.

While the proportions given in the above examples are suitable for the production of high grade chewing gum bases, it will be understood that the proportions may be substantially varied. My special elastic component may be employed to greatly improve any of the usual chewing gum bases because of its peculiar blending properties, and its life and springiness and its better chemical stability toward oxidation as compared with natural products heretofore used, which advantageous property is due to the absence of unstable radicals in the molecular structure.

What I claim is as follows:

1. An elastomer adapted for a chewing gum base consisting of methacrylic acid ester polymer having in the ester radical three or more carbon atoms and an ester of abietic acid.

2. An elastomer adapted for a chewing gum base consisting of methacrylic acid ester polymer having in the ester radical three or more carbon atoms and an ester of hydrogenated abietic acid.

3. An elastomer adapted for a chewing gum base consisting of methacrylic acid ester polymer having in the ester radical three or more carbon atoms, and a lower aliphatic ester of abietic acid.

4. An elastomer adapted for a chewing gum base consisting of butyl methacrylate and an ester of abietic acid.

5. An elastomer adapted for a chewing gum base consisting of methacrylic acid ester polymer having in the ester radical three or more carbon atoms, an ester of abietic acid, a high melting crystalline hydrophilic resin, and a low melting non-crystalline hydrophilic resin.

6. An elastomer adapted for a chewing gum base consisting of methacrylic acid ester polymer having in the ester radical three or more carbon atoms, a lower aliphatic ester of abietic acid, and a blend of natural gums selected from the class consisting of jelutong, gutta hangkang and gutta kay.

7. An elastomer adapted for a chewing gum base consisting of methacrylic acid ester polymer having in the ester radical three or more carbon atoms, a lower aliphatic ester of abietic acid, a high melting crystalline hydrophilic resin, a low melting non-crystalline hydrophilic resin, and a blending agent selected from oils and waxes.

8. An elastomer adapted for a chewing gum base comprising butyl methacrylate, methyl dihydro abietate, a crytalline resin which possesses hydrophilic and high melting characteristics, a non-crystalline low melting hydrophilic resin, and a blending agent selected from oils and waxes.

9. An elastomer adapted for a chewing gum base comprising methacrylic acid ester polymer having in the ester radical three or more carbon atoms, an ester of abietic acid, and a non-chicle material recognized in the chewing gum industry as a chicle substitute.

10. A chewing gum base in which the major elastic component consists of methacrylic acid ester polymer having in the ester radical three or more carbon atoms and an ester of abietic acid.

11. An elastomer adapted for a chewing gum base consisting of methacrylic acid ester polymer having in the ester radical three or more carbon atoms, a lower aliphatic ester of abietic acid, a high melting crystalline hydrophilic resin, a low melting non-crystalline hydrophilic resin, and at least one of the following: penterythrityl-abietate resin, and terpene polymer resin.

BORIS N. LOUGOVOY.